US006898651B2

(12) United States Patent
Wang et al.

(10) Patent No.: US 6,898,651 B2
(45) Date of Patent: May 24, 2005

(54) METHOD, APPARATUS, AND SYSTEM FOR GENERATING SERIAL INTERRUPT REQUESTS (IRQ) WITH POWER SAVINGS

(75) Inventors: Jennifer C. Wang, Tempe, AZ (US); Aniruddha P. Joshi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 10/143,165

(22) Filed: May 10, 2002

(65) Prior Publication Data

US 2003/0212844 A1 Nov. 13, 2003

(51) Int. Cl.[7] ............................. G06F 13/24; G06F 1/26; G06F 1/32
(52) U.S. Cl. ........................ 710/266; 713/300; 713/320; 710/260
(58) Field of Search ................................. 710/260–268, 710/106, 48; 713/300, 310, 320; 340/310.01; 379/90.01; 370/532

(56) References Cited

U.S. PATENT DOCUMENTS

| | | | |
|---|---|---|---|
| 5,327,121 A | * | 7/1994 | Antles, II ............... 340/825.51 |
| 5,367,695 A | | 11/1994 | Narad et al. |
| 5,392,407 A | | 2/1995 | Heil et al. |
| 5,499,346 A | | 3/1996 | Amini et al. |
| 5,524,235 A | | 6/1996 | Larson et al. |
| 5,537,654 A | | 7/1996 | Bedingfield et al. |
| 5,548,730 A | | 8/1996 | Young et al. |
| 5,555,430 A | | 9/1996 | Gephardt et al. |
| 5,579,522 A | | 11/1996 | Christeson et al. |
| 5,761,458 A | | 6/1998 | Young et al. |
| 5,790,849 A | | 8/1998 | Crocker et al. |
| 5,845,136 A | | 12/1998 | Babcock |
| 5,848,278 A | * | 12/1998 | Sakai .......................... 710/260 |
| 5,854,905 A | | 12/1998 | Garney |
| 5,881,294 A | * | 3/1999 | Downey et al. ............ 710/260 |
| 5,884,085 A | * | 3/1999 | Sakai et al. ................. 713/300 |
| 6,047,373 A | | 4/2000 | Hall et al. |
| 6,256,731 B1 | | 7/2001 | Hall et al. |
| 6,714,990 B1 | * | 3/2004 | Autio et al. ................ 709/250 |

OTHER PUBLICATIONS

"Real–time software for the wire per wire X–ray data acquisition system" by Briquet–Laugier, F.; Baumlin, P.; Boulin, C.; Golding F.; Koch, M.; Epstein, A. (abstract only) Publication Date: Jun. 14–18, 1999.*
Low Pin Count (LPC) Interface Specification, Revision 1.0, Sep. 29, 1997.

* cited by examiner

*Primary Examiner*—Gopal C. Ray
(74) *Attorney, Agent, or Firm*—Blakely, Sokoloff, Taylor & Zafman LLP (57) ABSTRACT

According to one embodiment of the invention, a first signal line is provided for a serial interface unit (SIU) of an I/O controller to report interrupt requests to an interrupt controller. In one embodiment, a transition of the first signal line from a first level (e.g., low level or logic 0) to a second level (e.g., high level or logic 1) indicates a pending interrupt to the interrupt controller. A pull up resistor is provided to pull the first signal line to the second level when the first signal line is not driven by the SIU. In response to detecting an interrupt request initiated by an I/O device, a transition from the first level to the second level is generated on the first signal line for a predetermined duration to report the pending interrupt request to the interrupt controller.

30 Claims, 6 Drawing Sheets

METHOD, APPARATUS, AND SYSTEM FOR GENERATING SERIAL INTERRUPT REQUESTS (IRQ) WITH POWER SAVINGS

FIELD

An embodiment of the invention relates to the fields of data communications/transfer, interrupt management, and power management, and more specifically, relates to a method, apparatus, and system for generating serial interrupt requests (IRQ) with power savings.

BACKGROUND

As computer devices and systems continue to advance and become more complex, effective and efficient power management of computer devices and systems have become more and more important in system design and implementation. Typically, a computer system may include an input/output (I/O) control unit (also called I/O controller herein) that provides the interface control between various I/O or peripheral devices and a central processing unit (CPU) (also called host processor or host herein). The I/O controller can be a stand-alone unit, an integrated part of a chipset, or a part of some larger unit that controls the interfaces between various system components and the host processor. A typical I/o controller may include a serial interface unit (SIU) that controls serial interrupt requests (SERIRQ) protocol which allows a single signal to be used to report interrupt requests. Typically, the serial IRQ signal is provided to an interrupt controller via a serial IRQ signal line coupling between the SIU and the interrupt controller. Generally, a typical interrupt controller is responsible for accepting, prioritizing, and report interrupts requests that are initiated by peripheral devices to the host processor. The interrupt controller may be a stand-alone unit or an integrated part of the I/O controller, depending on the various system designs and configurations. The SIU is generally responsible for generating the serial IRQ signal to notify the interrupt controller of incoming interrupt requests. Typically, the SIU can operate in a continuous mode or a quiet mode. The quiet mode is used when the system wants to save power and the host will not keep polling the peripheral devices every frame to see if an interrupt has occurred. However, the majority of computer system platforms operate in the continuous mode. When the system operates in the continuous mode, generating the serial IRQ signal involves driving the serial IRQ signal line low for every serial IRQ frame if there is no pending interrupt request and then driving the serial IRQ signal line high when there is a pending interrupt request. Generation of the serial IRQ signal in this manner consumes more power and thus is not efficient, especially since power savings have become more and more critical in system design and implementation due to power, space, and area constraints.

DETAILED DESCRIPTION

Figure 1:
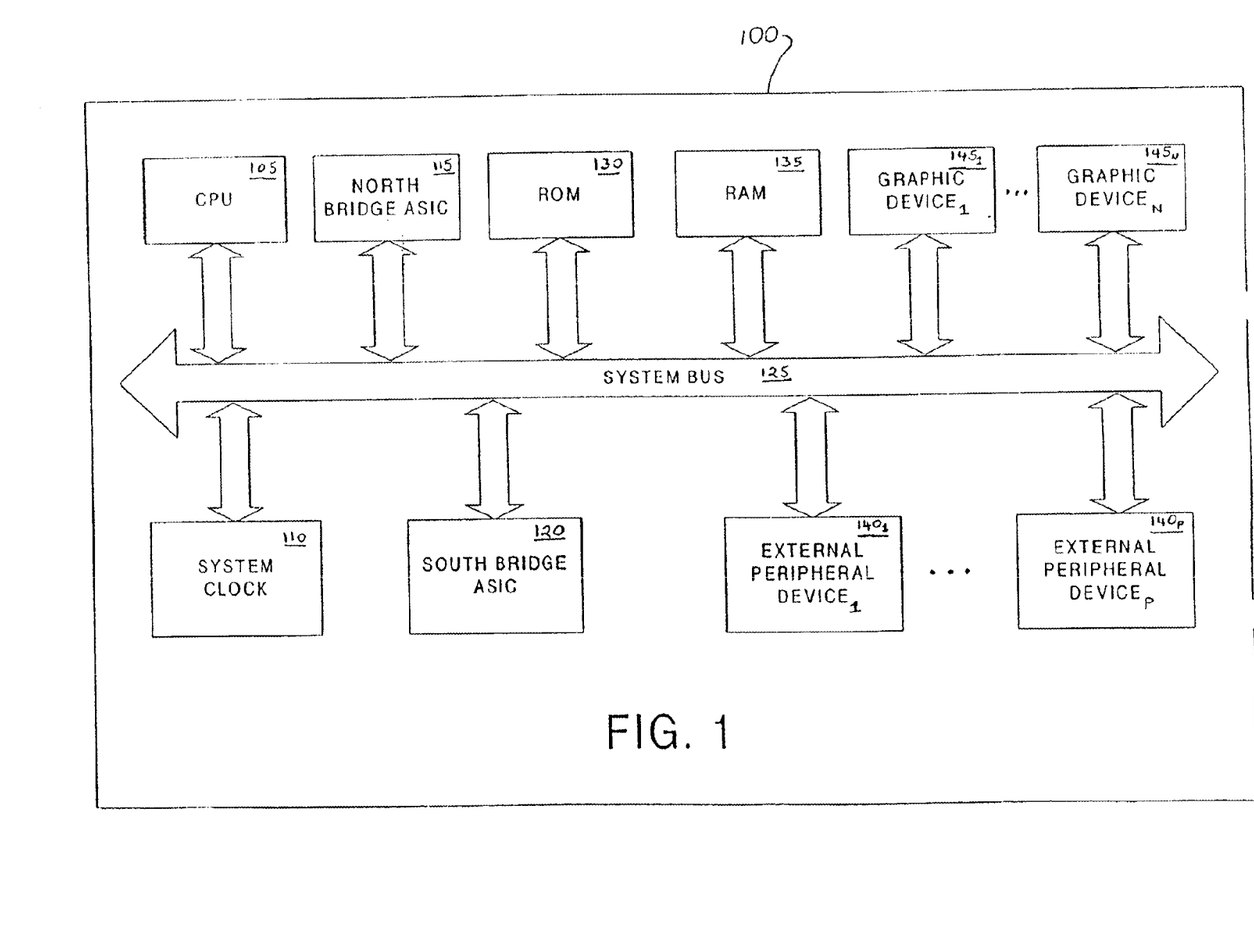
FIG. 1 is an exemplary block diagram showing pertinent functional components of an exemplary system configuration in accordance with one embodiment of the invention.

FIG. 1 is an exemplary block diagram showing pertinent functional components of an exemplary system configuration 100 in accordance with one embodiment of the present invention. Exemplary system configuration 100 can be a laptop computer, a desktop computer, a network storage device, a network server, a network storage device, a set-top-box, a hand-held device, a network appliance, or any devices with computing capability.

As shown in FIG. 1, the system configuration 100 can include a CPU (Central Processing Unit) or host processor 105, a system clock 110, a North Bridge ASIC (Application Specific Integrated Circuit) 115, and a South Bridge ASIC 120 (also called I/O control unit or I/O controller herein). CPU 105, North Bridge ASIC 115, and South Bridge ASIC 120 are operatively coupled to a system address, data, and control bus (or system bus) 125. CPU 105 can communicate with North Bridge ASIC 115 and South Bridge ASIC 120 through the system bus 125. In one embodiment, system bus 125 is a PCI (Peripheral Component Interconnect) bus. System clock 110 generally provides timing pulses at constant time intervals that can be used by other components within the system.

North Bridge ASIC 115 can generally serve as a controller for memory devices 130, 135 and graphic devices $145_1, \ldots, 145_N$ (where "N" is a positive integer). Memory devices 130 and 135 can include read-only memory (ROM) 130 and random access memory (RAM) 135. Unlike RAM 135, the contents in ROM 130 are not erased when power is turned off. Furthermore, users typically cannot modify the contents in ROM 130.

South Bridge ASIC 120 can generally serve as a controller for external peripheral devices $140_1, \ldots, 140_P$ (where "P" is a positive integer). Examples of an external peripheral device $140_1, \ldots, 140_P$ may include a hard disk, a keyboard, a mouse, a Universal Serial Bus (USB) peripheral such as a scanner, a printer, a keyboard, a mouse, or a removable media, and other legacy devices.

Figure 2:
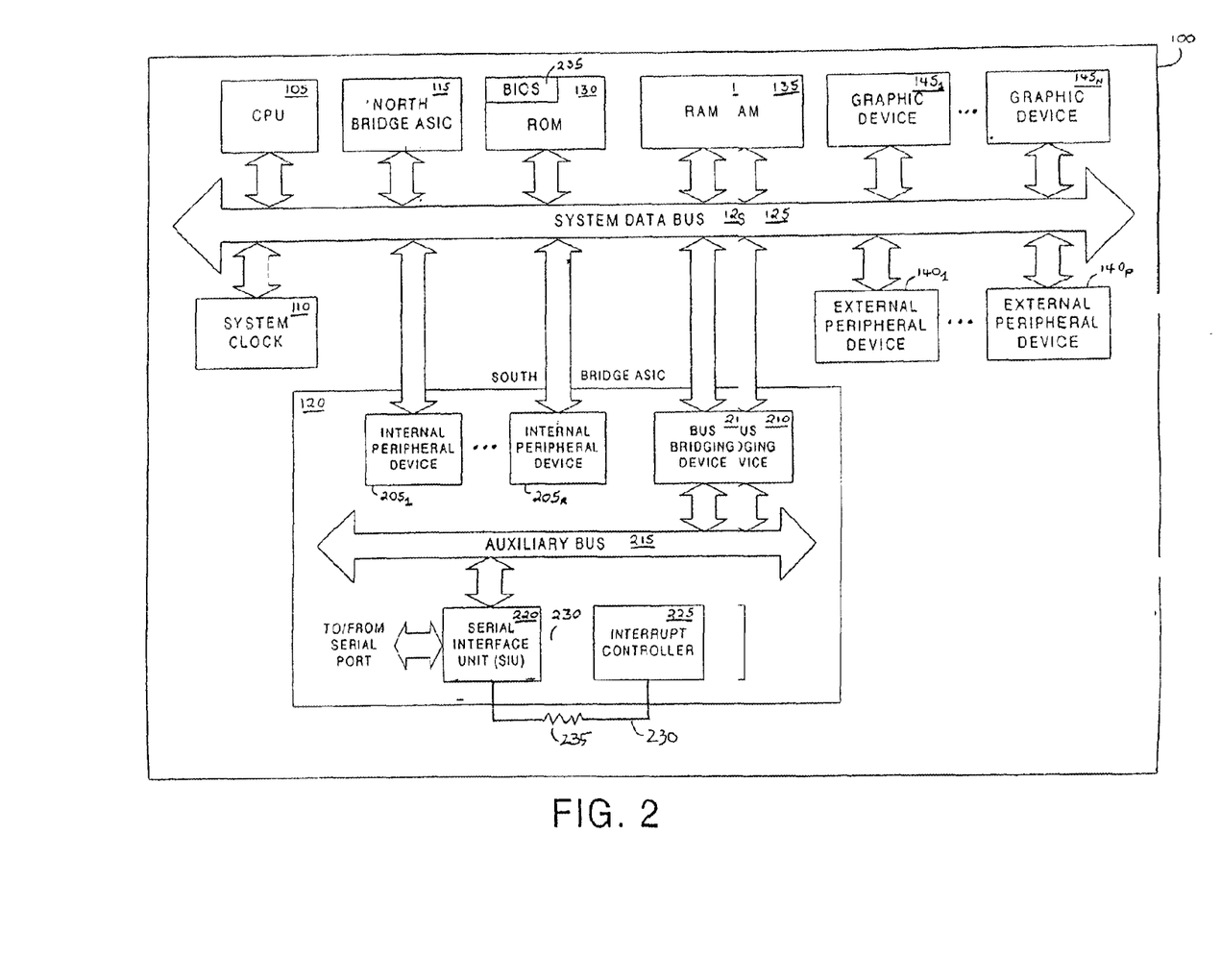
FIG. 2 shows an exemplary block diagram showing pertinent functional components of an exemplary system configuration with additional details on the South Bridge ASIC in accordance with one embodiment of the invention.

FIG. 2 shows an exemplary block diagram showing pertinent functional components of the system configuration 100 with additional details on the South Bridge ASIC 120 in accordance with one embodiment of the invention. South Bridge ASIC 120 can include a plurality of internal peripheral devices $205_1, \ldots, 205_R$ (where "R" is a positive integer) that are operatively coupled to the system bus. In one embodiment, examples of internal peripheral devices $205_1, \ldots, 205_R$ may include a hard disk driver controller, a general purpose timer, a PCI bus controller, a serial communication controller, etc.

When a user turns a power on/off switch on, or presses a reset button, the computing device boots itself. Booting generally initiates BIOS (Basic Input/Output System) 235 typically included in ROM 130. BIOS 235 generally facilitates the transfer of data and instructions between the CPU 105 and peripheral devices. BIOS 235 can clear memory, execute diagnostics, and execute other tasks to prepare the computing device for use. When BIOS 235 performs a Power On System Test (POST), BIOS 235 can detect the peripheral devices and modify the configuration addresses of these peripheral devices.

South Bridge ASIC 120 can also include a bus-bridging device 210 that is operatively coupled to the system bus 125 and the auxiliary address, data, and control bus (or auxiliary bus) 215 to generally transfer data back and forth between the system bus 125 and the auxiliary bus 215. In one embodiment, the auxiliary bus 215 conforms to the Low Pin Count (LPC) Specification published by Intel® Corporation.

South Bridge ASIC 120 can further include a Serial Interface Unit (SIU) 220. In one embodiment, SIU 220 can include two standard Universal Asynchronous Receivers/Transmitters (UART). SIU 220 is generally a serial communication controller that is operatively coupled to a standard serial port to receive data signals from the serial port and to transmit data signals to the serial port. SIU 220 can also be operatively coupled to the auxiliary bus 215 in order to communicate with other components 105, 110, 115, 130, 135, $140_1, \ldots, 140_P, 145_1, \ldots, 145_N, 205_1, \ldots, 205_R$, 210 within the computing device 100.

South Bridge ASIC 120 can additionally include an interrupt controller 225 that is coupled to receive a serial interrupt request (SERIRQ) signal generated by the SIU 220 via the SERIRQ line 230. In one embodiment, the Interrupt controller 225 functions as a manager to accept interrupt requests from peripheral devices, prioritize them, and reporting these interrupt requests to the CPU 105. In this embodiment, the interrupt controller is configured to accept serial interrupt requests (SERIRQ) generated by the SIU 220 on the SERIRQ line 230. In this embodiment, the SERIRQ line 230 has a pull up resistor 235 that may exist outside of the South Bridge ASIC 120. The operations of the SIU 220, the interrupt controller 225 are described in more details below.

Figure 3:
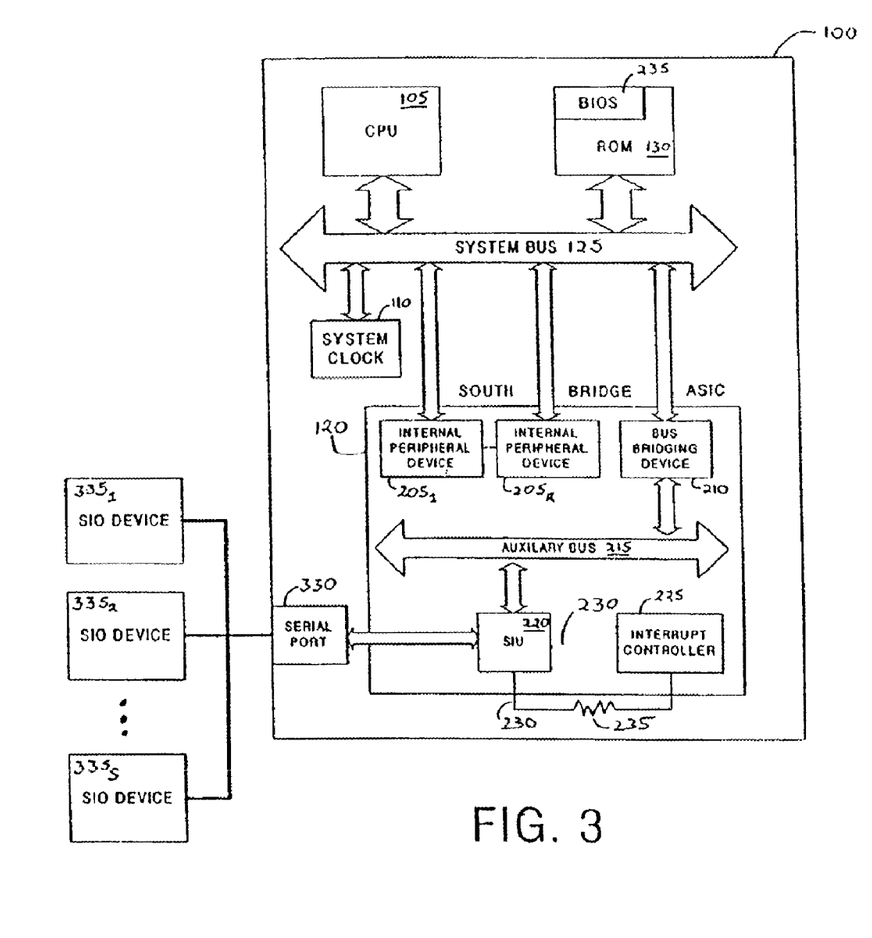
FIG. 3 shows a simplified version of an exemplary system configuration in accordance with one embodiment of the invention.

FIG. 3 shows a simplified system configuration 100 in accordance with one embodiment of the invention. As shown in FIG. 3, the system configuration 100 can include a standard serial port 330. Serial Input/Output (SIO) devices $335_1, \ldots, 335_S$ (where "S" is a positive integer) can be attached to the serial port 330 of the system 100. As stated above, SIU 220 is generally a serial communication controller that is operatively coupled to a standard serial port to receive data signals from the serial port and to transmit data signals to the serial port. In addition, SIU 220 can also be operatively coupled to the auxiliary bus 215 in order to communicate with other components 105, 110, 115, 130, 135, $140_1, \ldots, 140_P, 145_1, \ldots, 145_N, 205_1, \ldots, 205_R$, 210 within the computing device 100. As such, SIU 220 can be used to facilitate communication between the SIO devices $335_1, \ldots, 335_S$ and other components 105, 110, 115, 130, 135, $140_1, \ldots, 140_P, 145_1, \ldots, 145_N, 205_1, \ldots, 205_R$, 210 within the computing device 100 using the auxiliary bus 215. In addition, as described in more details below, the SIU 220 is responsible for generating a serial IRQ signal to the interrupt controller 225 via the SERIRQ line 230 to notify the interrupt controller 225 of incoming serial interrupt requests received by the SIU 220 from peripheral or I/O devices.

As described herein, the South Bridge ASIC 120 supports serial IRQ scheme or protocol to allow a single signal (e.g., SERIRQ) to be used to report interrupt requests initiated by peripheral or I/O devices.

The following is a general description of a standard serial IRQ protocol. In one embodiment, the signal line (SERIRQ) 230 is synchronous to the clock cycles of a PCI bus and follows the sustained tri-state protocol. The serial IRQ protocol defines the sustained tri-state signaling in the following fashion:

S—Sample Phase; signal driven low;
R—Recovery Phase; signal driven high; and
T—Turn-around Phase; signal released.

The serial IRQ protocol has two modes of operation, including:

Continuous—where the South Bridge ASIC 120 is responsible for generating the start frame; and
Quiet—where a serial IRQ peripheral is responsible for beginning the start frame.

Start Frame

The mode that is entered when enabling the serial IRQ protocol is the continuous mode. In the continuous mode, the I/O controller will assert the start frame. When the serial IRQ stream enters quiet mode, the SERIRQ line remains inactive and pulled up between the Stop and Start Frame until a peripheral drives the SERIRQ signal low. The I/O controller senses the line low and continues to drive it low for the remainder of the Start Frame. Since the first PCI clock of the start frame was driven by the peripheral in the quiet mode, the I/O controller drives the SERIRQ line low for 1 PCI clock less than in continuous mode. This mode of operation allows for a quiet and, therefore, lower power consumption.

Data Frames

Once the Start Frame has been initiated, all of the SERIRQ peripherals should start counting frames based on the rising edge of the SERIRQ. Each of the IRQ/DATA frames generally has three phases, including:

Sample Phase—During this phase, the SERIRQ device drives SERIRQ low if the corresponding interrupt signal is low. If the corresponding interrupt is high, the SERIRQ devices tri-state the SERIRQ signal. The SERIRQ line remains high due to pull-up resistors.

Recovery Phase—During this phase, the device drives the SERIRQ high if in the Sample Phase the SERIRQ was driven low. If the SERIRQ was not driven in the Sample Phase, it is tri-stated in this phase.

Turn-around Phase—The device will tri-state the SERIRQ line.

Stop Frame

After all data frames, a Stop Frame is driven by the I/O controller. The SERIQ signal is driven low by I/O controller for 2 or 3 PCI clocks. The number of clocks is determined by the SERIQ configuration register. The number of clocks determines the next mode. If the next mode is the quiet mode, the width for the stop frame can span over two clock cycles. During the quiet mode, any SERIRQ device may initiate a Start Frame. In the next mode is the continuous mode, the width for the stop frame can span over three clock cycles. During the continuous mode, only the I/O controller may initiate a Start Frame.

Figure 4:
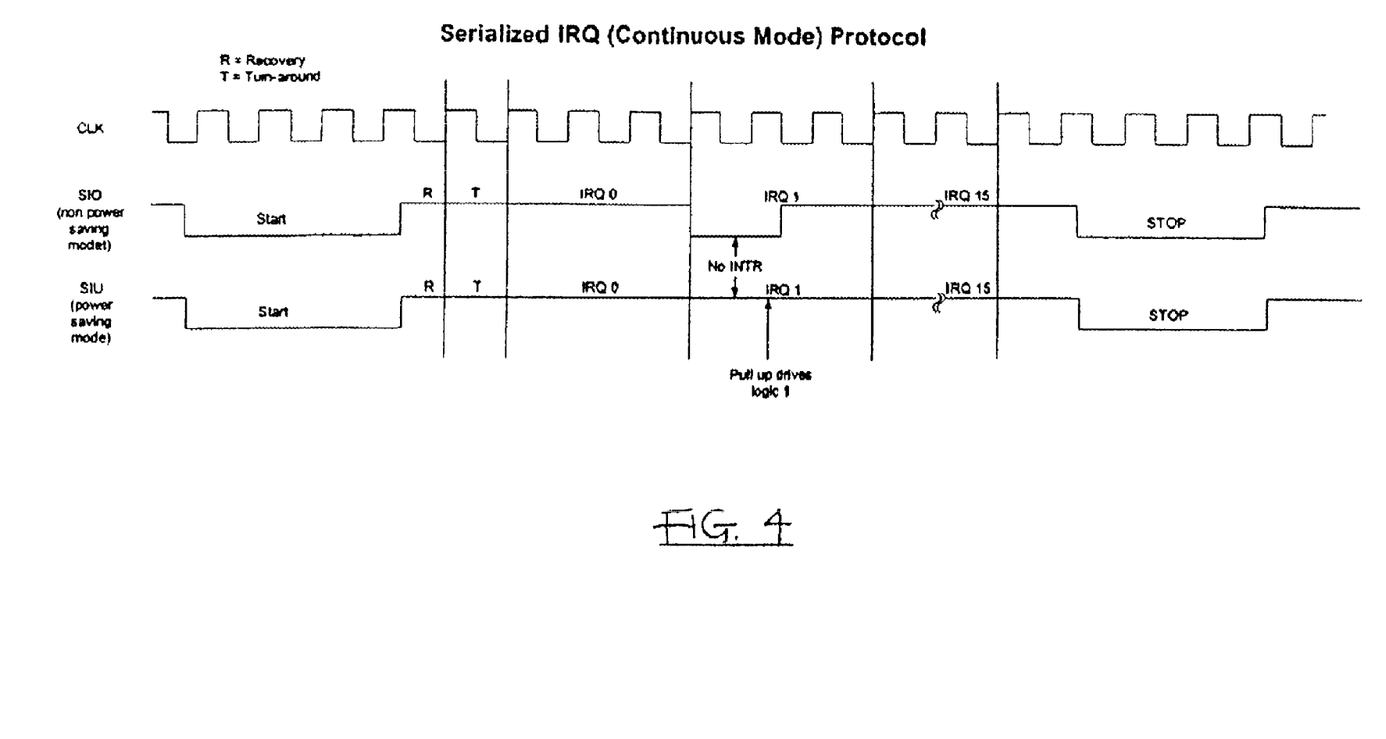
FIG. 4 is an exemplary timing diagram which illustrates the various phases of a standard serial IRQ protocol which includes various timing requirements for the SERIRQ signal in the continuous mode.

FIG. 4 is an exemplary timing diagram which illustrates the various phases of a standard serial IRQ protocol which includes various timing requirements for the SERIRQ signal in the continuous mode, as applied to a standard SIO device and an SIU device with pull up resistor such as the SIU 220. As shown in FIG. 3, the standard serial IRQ protocol includes the start frame, data frame(s), and the stop frame.

Referring again to FIG. 3, in one embodiment, the SIU 220 contains two UARTs. The SIU 220 will generate a different serial interrupt request (SERIRQ) for each UART. As described above, serial IRQ protocol can operate in continuous mode or quiet mode. The quiet mode is used when the system wants to save power and the host will not keep polling the peripherals every frame to see if an interrupt has occurred. However, a majority of the system platforms operate in the continuous mode that requires more power. An embodiment of the invention provides a new method to enable the system to save power in continuous mode, as explained in details below.

To save power in the continuous mode, a global configuration register includes a bit that allows the UART interrupt to be generated once during continuous mode and flip the polarity of the serial IRQ generation so that power is minimized. During normal operation (also referred to as first operating mode or non-power-saving mode), if the internal UART interrupt line is low (there is no interrupt), the SIU 220 has to drive the serial IRQ line 230 low for every serial IRQ frame with respect to the UART specific slot. Once the internal UART interrupt line is high, then SIU 220 does not drive the serial IRQ line 230 because it has an external pull up resistor 235 to indicate a high in the SIU interrupt. This in turn will cause the interrupt controller 225 to detect a low to high transition and generate an interrupt to the CPU 105. When the system operates with the power saving feature (also called second operating mode or power-saving mode), if the internal interrupt line is low, the SIU 220 leaves the serial IRQ undriven until an interrupt is detected (e.g., until the internal interrupt line is high). At that time, the SIU 220 will drive the serial IRQ line 230 low for only one serial IRQ frame, then tri-state the next serial IRQ frame to cause a low to high transition so that the interrupt controller 225 can detect an interrupt. This power-saving feature according to one embodiment of the invention can save significant power because the SIU 220 does not drive the serial IRQ line 230 until an interrupt is detected and then only one frame is driven. As such, significant power saving can be achieved during continuous mode operation.

Figure 5:
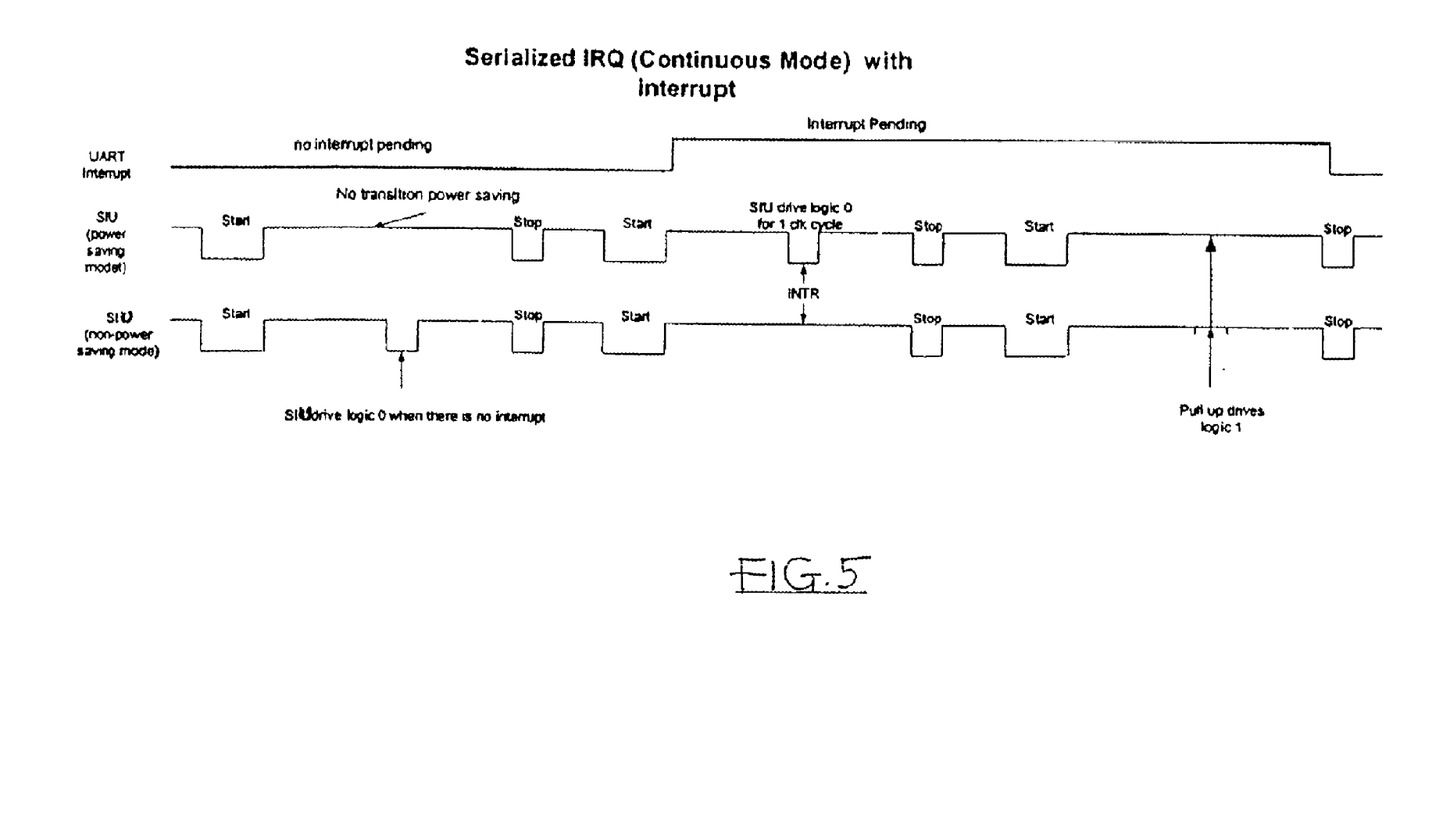
FIG. 5 shows an exemplary timing diagram which illustrates the various phases of a serial IRQ protocol in continuous mode with interrupt, in accordance with one embodiment of the invention.

FIG. 5 shows an exemplary timing diagram which illustrates the various phases of a serial IRQ protocol in continuous mode with interrupt, in accordance with one embodiment of the invention. As shown in FIG. 5, an SIU operated without the power saving feature will need to drive the SERIRQ line low (e.g., logic 0) when there is no interrupt. In contrast, an SIU operated with the power saving feature according to one embodiment of the invention as described above will leave the SERIRQ line undriven until an interrupt is detected (e.g., UART interrupt line goes high). When an interrupt is detected, the SIU will drive the serial IRQ line low (e.g. logic 0) for only one serial IRQ frame and then tri-state the next serial IRQ frame to generate a low (first level) to high (second level) transition so that the interrupt controller can detect an interrupt request.

Figure 6:
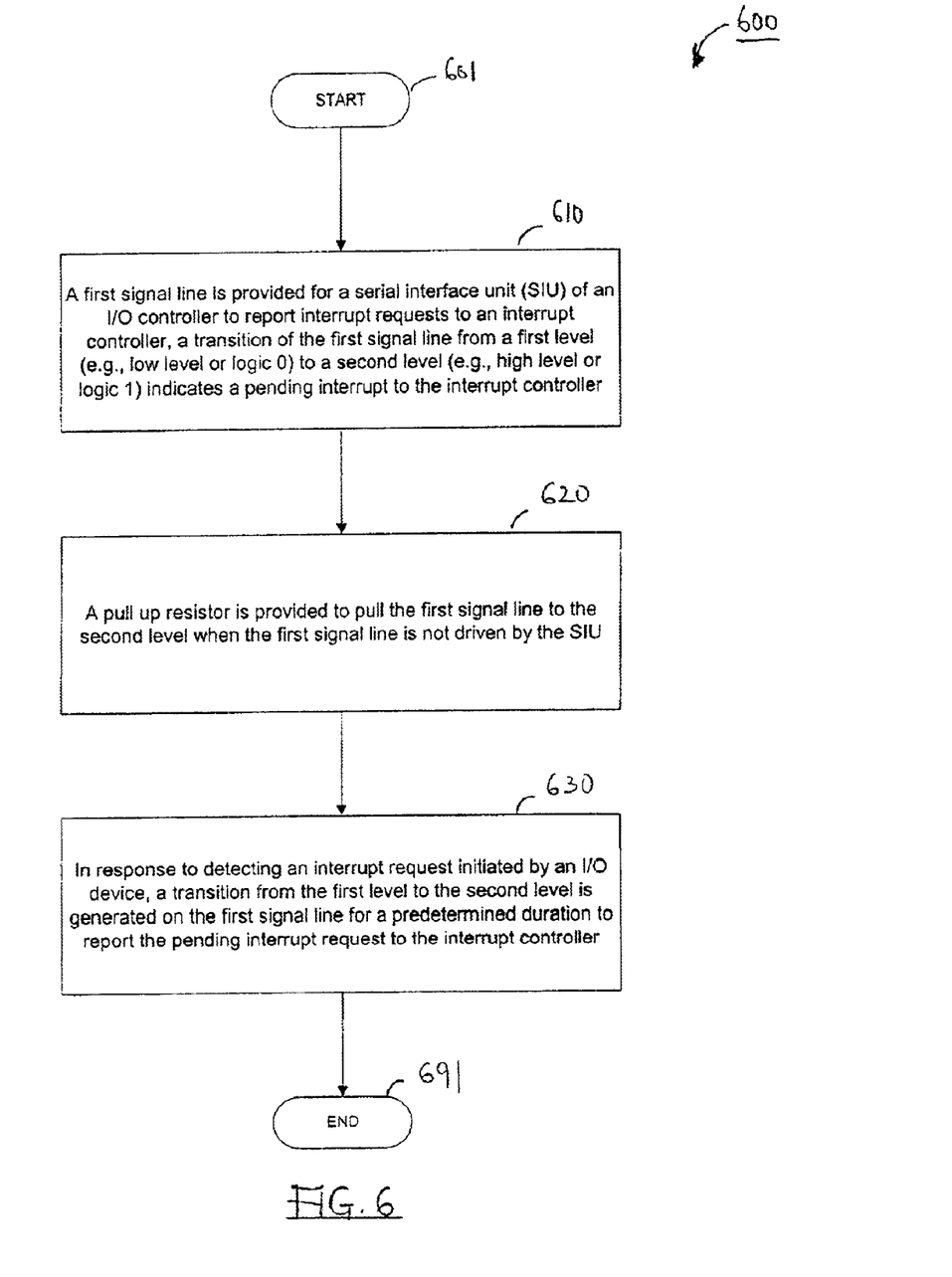
FIG. 6 shows a flow diagram of a method according to one embodiment of the invention.

FIG. 6 shows a flow diagram of a method 600 according to one embodiment of the invention. At block 610, a first signal line (e.g., the SERIRQ line 230) is provided for a serial interface unit (e.g., SIU 220) of an I/O controller (e.g., South Bridge ASIC 120) to report interrupt requests to an interrupt controller (e.g., interrupt controller 225). In one embodiment, a transition of the first signal line from a first level (e.g., low level or logic 0) to a second level (e.g., high level or logic 1) indicates a pending interrupt (e.g., a serial interrupt request initiated by an I/O device has been detected by the SIU) to the interrupt controller. At block 620, a pull up resistor (e.g., pull up resistor 235) is provided to pull the first signal line to the second level when the first signal line is not driven by the SIU. At block 630, in response to detecting an interrupt request initiated by an I/O device, a transition from the first level to the second level is generated (e.g., by the SIU) on the first signal line for a predetermined duration (e.g., one frame or one clock cycle) to report the pending interrupt request to the interrupt controller. In one embodiment, the SIU generates the transition on the first signal line by driving the first signal line to the first level (e.g., low or logic 0) for one SERIRQ frame and then performing a tri-state operation on the next SERIRQ frame to cause the transition from the first level to the second level on the first signal line.

The following example illustrates an amount of power savings that may be achieved based on certain assumptions. In this example, it is assumed that each serial IRQ frame has a duration of approximately 60 PCI clock cycles, the external pull up resistor is about 100K, serial IRQ operates at approximately 33 MHz (e.g., PCI clock frequency) and 3.3 Volts. Based on system level simulation (SLS) data, the SIU may have an interrupt about 15% of the total system time or less. In this example, there are two UARTs each will drive the serial IRQ line low for one clock per frame and about 85% of the time. Thus, the power savings can be calculated as follows:

Power saving=1/60*2*3.3/100K*0.85=0.0935 uA per each serial IRQ frame.

Furthermore, it is assumed that each frame spans approximately 60 clock cycles, and each clock cycle takes about 30 ns. Therefore, in a second, there is approximately 5.6×10**5 frames. Thus, the total power savings would be about 52 mA per second. The calculation of the total power savings per second can be demonstrated using the following equation:

(1 second/(60*30 nsec))*0.0935 uA=52 mA per second.

The interrupt generation with power saving feature according to one embodiment of the invention as described above is compatible with an interrupt controller that operates in an edge triggered mode (edge detection). In the edge triggered mode, the serial IRQ line is required to be held high after the edge has occurred.

It should also be noted that the functional components, as shown in the figures and described above in the text accompanying the figures, could be implemented in hardware. However, these functional components can also be implemented using software code segments. Each of the code segments may include one or more programming instructions. If the aforementioned functional components are implemented using software code segments, these code segments can be stored on a machine-readable medium, such as floppy disk, hard drive, CD-ROM, DVD, tape, memory, or any storage device that is accessible by a computing machine.

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
    means for providing a first signal line for a serial interface unit (SIU) of an input/output (I/O) controller to report to an interrupt controller interrupt requests that are initiated by one or more input/output (I/O) devices coupled to the I/O controller, a transition of the first signal line from a first level to a second level indicating a pending interrupt;
    means for providing a pull up resistor to pull the first signal line to the second level when the first signal line is not driven; and means for generating a transition from the first level to the second level on the first signal line for a predetermined duration to report the pending interrupt request to the interrupt controller in response to detecting an interrupt request initiated by the one or more I/O devices.

2. The apparatus of claim 1 wherein means for generating the transition includes:
means for driving the first signal line to the first level for one frame; and
means for performing a tri-state operation on a next frame to cause a transition from the first level to the second level on the first signal line.

3. The apparatus of claim 1 wherein the resistance of the pull up resistor is determined to have a corresponding voltage level sufficient to indicate the first level on the first signal line.

4. The apparatus of claim 1 wherein the first level corresponds to a low voltage level and the second level corresponds to a high voltage level.

5. The apparatus of claim 4 wherein the low voltage level is approximately zero volt and the high voltage level is approximately 3.3 volts.

6. The apparatus of claim 1 wherein the serial interface unit (SIU) controls the setting of the first signal line.

7. The apparatus of claim 6 wherein the I/O controller includes an internal interrupt line that is set to a first level when there is no pending interrupt request and set to a second level when there is a pending interrupt request.

8. The apparatus of claim 7 wherein the SIU includes a first I/O interface unit which controls the setting of the internal interrupt line.

9. The apparatus of claim 8 wherein the first I/O interface unit is a Universal Asynchronous Receiver-Transmitter (UART) device.

10. The apparatus of claim 7 wherein, in a first operating mode, the SIU drives the first signal line to the first level if the internal interrupt line is set to the first level, and wherein, in a second operating mode, the SIU leaves the first line undriven if the internal interrupt line is set to the first level.

11. An apparatus comprising:
a first component to manage serial interrupt request (IRQ) protocol for one or more I/O devices coupled to communicate data with a host processor;
an interrupt controller to manage interrupts requests that are initiated by the one or more I/O devices via the first component and to report the interrupt request to a host processor for corresponding services; and
a first signal line used by the first component to communicate pending interrupt requests to the interrupt controller, wherein a transition of the first signal line from a first level to a second level indicating a pending interrupt request, the first signal line having a pull up resistor to pull the first signal line to the second level when the first signal line is not driven by the first component and wherein the first component generating a transition from the first level to the second level on the first signal line for a predetermined duration in response to an interrupt request initiated by the one or more I/O devices.

12. The apparatus of claim 11 wherein the first component drives the first signal line to the first level for one frame and performs a tri-state operation on a next frame to generate a transition from the first level to the second level on the first signal line.

13. The apparatus of claim 11 wherein the resistance of the pull up resistor is determined to have a corresponding voltage level sufficient to indicate the first level on the signal line.

14. The apparatus of claim 11 wherein the first level corresponds to a low voltage level and the second level corresponds to a high voltage level.

15. The apparatus of claim 14 wherein the low voltage level is approximately zero volt and the high voltage level is approximately 3.3 volts.

16. The apparatus of claim 11 wherein the first component is a serial interface unit (SIU).

17. The apparatus claim 16 further including an internal interrupt line that is set to a first level when there is no pending interrupt request and set to a second level when there is a pending interrupt request.

18. The apparatus of claim 17 wherein the first component includes a first I/O interface unit which controls the setting of the internal interrupt line.

19. The apparatus of claim 18 wherein the first I/O interface unit is a Universal Asynchronous Receiver-Transmitter (UART) device.

20. The apparatus of claim 17 wherein, in a first operating mode, the SIU drives the first signal line to the first level if the internal interrupt line is set to the first level, and wherein, in a second operating mode, the SIU leaves the first signal line undriven if the internal interrupt line is set to the first level.

21. A system comprising:
a first processor;
a system memory coupled to the first processor via a system bus; and
an input/output (I/O) controller coupled to the first processor via the first system bus, the I/O controller including:
a first component to manage serial interrupt request (IRQ) protocol for one or more I/O devices;
an interrupt controller to manage interrupts requests that are initiated by the one or more I/O devices via the first component and to report the interrupt request to a first processor; and
a first signal line used by the first component to communicate pending interrupt requests to the interrupt controller, wherein a transition of the first signal line from a first level to a second level indicating a pending interrupt request, the first signal line having a pull up resistor to pull the first signal line to the second level when the first signal line is not driven by the first component and wherein the first component generating a transition from the first level to the second level on the first signal line for a predetermined duration in response to an interrupt request initiated by the one or more I/O devises.

22. The system of claim 21 wherein the first component drives the first signal line to the first level for one frame and performs a tri-state operation on a next frame to generate a transition from the first level to the second level on the signal line.

23. The system of claim 21 wherein the resistance of the pull up resistor is determined to have a corresponding voltage level sufficient to indicate the first level on the first signal line.

24. The system of claim 21 wherein the first level corresponds to a low voltage level and the second level corresponds to a high voltage level.

25. The system of claim 24 wherein the low voltage level is approximately zero volt and the high voltage level is approximately 3.3 volts.

26. The system of claim 21 wherein the first component is a serial interface unit (SIU).

27. The system of claim 26 wherein the I/O controller includes an internal interrupt line that is set to a first level when there is no pending interrupt request and set to a second level when there is a pending interrupt request.

28. The system of claim 27 wherein the first component includes a first I/O interface unit which controls the setting of the internal interrupt line.

29. The system of claim 28 wherein the first I/O interface unit is a Universal Asynchronous Receiver-Transmitter (UART) device.

30. The system of claim 27 wherein, in a first operating mode, the SIU drives the first signal line to the first level if the internal interrupt line is set to the first level, and wherein, in a second operating mode, the SIU leaves the first signal line undriven if the internal interrupt line is set to the first level.

* * * * *